United States Patent Office 3,415,836
Patented Dec. 10, 1968

3,415,836
SALICYLIC ACID ESTERS OF β-PYRIDYL CARBINOL
Bo Thuresson Af Ekenstam, Molndal, and Carl Göran Claeson, Goteborg, Sweden, assignors to Aktiebolaget Bofors, Bofors, Sweden
No Drawing. Filed June 22, 1966, Ser. No. 559,401
Claims priority, application Sweden, June 28, 1965, 8,482/65
2 Claims. (Cl. 260—295.5)

ABSTRACT OF THE DISCLOSURE

Esters of salicylic acid and β-pyridyl carbinol of the formula

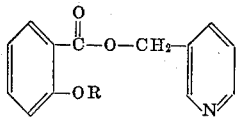

wherein R is hydrogen, benzoyl, acetyl, propionyl, or butyryl are prepared in the conventional manner from salicylic acid derivatives and β-pyridyl carbinol. The esters have both analgesic and vasodilating activities.

The present invention relates to an ester of salicylic acid or a derivative thereof and β-pyridyl carbinol or a derivative thereof. The compounds in question have proved to have both an analgesic and a vasodilating effect. The new esters are produced through an available analogy method, which, generally speaking, can be described in such a way that a compound with the formula

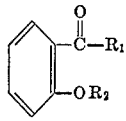

is made to react with another compound with the formula

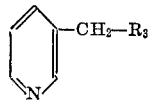

in which $R_1$ is a chlorine atom, a bromine atom, a hydroxyl group or an $OR_4$ group, in which $R_4$ consists of a metal atom, for instance sodium or potassium, in which $R_2$ is a hydrogen atom or an acyl group, viz, benzoyl or $C_nH_{2n+1}CO$, in which $n=1$, 2 or 3, and in which $R_3$ is an OH— group, chlorine atom or bromine atom, forming an ester with the formula

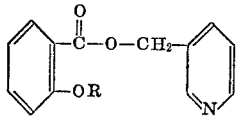

A preferred new ester is produced most appropriately through the reaction between acetyl salicylic acid chloride and β-pyridyl carbinol in benzene and in the presence of a hydrochloric acid carrying tertiary amine. The acetyl group in the acetyl salicylic acid acts as a protective group which prevents the polymerization which would otherwise easily take place between several salicylic acid chloride molecules under the prevailing conditions. It should be obvious that if an injectible compound is desired, the compound obtained is converted in a known way to a salt compatible with tissue, for instance a hydrochloride.

EXAMPLE 1

95.5 g. (0.48 mole) of acetyl salicylic acid chloride, freshly prepared, dissolved in 50 g. of benzene, is dripped while stirring and cooling into a reaction retort with 60 g. (0.55 mole) of β-pyridyl carbinol, 50 g. (0.50 mole) of triethyl amine and 200 g. of benzene, so that the temperature, during the addition of the chloride, does not exceed 18° C. The reaction time depends upon the cooling capacity, but should appropriately not require more than 2 hours. The mixture is allowed to post-react at 20–25° C., for 12–16 hours, with continued stirring. During the reaction, triethylamine hydrochloride is formed, most of which is precipitated through the addition of 75 g. of diethyl ether. The triethylamine hydrochloride is filtered off, and the remaining benzene-ether solution, containing the reaction product, the ester of acetyl-salicylic acid and β-pyridyl carbinol is extracted with 600 g. of 1-n hydrochloric acid. The hydrochloric acid extract is heated rapidly to near the boiling point, and thereafter cooled just as rapidly to 15–20° C. The acid saline solution is neutralized with 10% ammonia, and the ester of salicylic acid and β-pyridyl carbinol is precipitated as a pale yellowish oil. 150 g. of benzene is added to dissolve the oil, after which the water phase is separated off. The benzene solution is washed twice with 150 g. of water each time. After drying with 10 g. of $CaCl_2$ and distillation to remove the benzene, a refined ester of salicylic acid and β-pyridyl carbinol is obtained, which is dissolved in 200 g. of dried methylethyl ketone. Well-dried HCl gas is conveyed to the methylethyl ketone solution, and the hydrochloride of the salicylic acid pyridyl carbinol ester is then precipitated in a crystalline form, and this is continued until a small filtered sample of HCl gas does not give any further precipitation of chloride. If required, the hydrochloride can easily be recrystallized from the methylethyl ketone in the presence of active carbon. The direct yield is 77 g. (=60%) of salicylic acid-β-pyridyl carbinol ester, and a further, approx. 10%, can be obtained by working up mother liquids.

We claim:
1. An ester of the formula

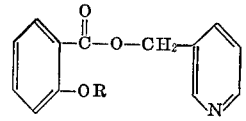

wherein R is hydrogen and acetyl.
2. An ester according to claim 1, wherein R is hydrogen.

References Cited

UNITED STATES PATENTS 2,759,945  8/1956  Anderson _____ 260—295.5

OTHER REFERENCES

Noller: Chemistry of Organic Compounds, Saunders, second edition (1957), pp. 160, 161, 163, 165–169.

HENRY R. JILES, *Primary Examiner.*

A. L. ROTMAN, *Assistant Examiner.*

U.S. Cl. X.R.

167—65